March 3, 1942. T. R. ARDEN 2,274,644
INTERNAL COMBUSTION ENGINE AND ADJUNCTS THEREFOR
Filed June 12, 1939 4 Sheets-Sheet 1

Inventor
Thomas R. Arden,
By Wolhaupter & Groff
Attorneys March 3, 1942. T. R. ARDEN 2,274,644
INTERNAL COMBUSTION ENGINE AND ADJUNCTS THEREFOR
Filed June 12, 1939 4 Sheets-Sheet 2

Inventor
Thomas R. Arden,

Patented Mar. 3, 1942

2,274,644

UNITED STATES PATENT OFFICE 2,274,644

INTERNAL COMBUSTION ENGINE AND ADJUNCTS THEREFOR

Thomas R. Arden, Freeport, N. Y.

Application June 12, 1939, Serial No. 278,772

4 Claims. (Cl. 123—47)

This invention relates to internal combustion engines, and to internal combustion engine adjuncts, and has generally in view to provide an internal combustion engine and adjuncts therefor embodying various improved features of construction.

One special object of the invention is to provide an internal combustion engine embodying a novel inlet part and valve arrangement and a novel exhaust part arrangement whereby the engine is substantially completely scavenging at all speeds and is highly efficient and may be constructed to have an exceptionally high horsepower to weight ratio.

Another special object of the invention is to provide an internal combustion engine embodying a construction whereby, without fuel injection such as characterizes engines of the Diesel type, the same may be operated without spark ignition.

Another special object of the invention is to provide an improved internal combustion engine timer embodying a design which consumes very little power for its operation, thus rendering the same particularly advantageous for use on miniature engines such as are employed for miniature aircraft propulsion where loss of power in driving a timer is an important consideration.

Another special object of the invention is to provide an internal combustion engine timer capable of general use and which embodies a construction insuring exceptionally quick breaking of its contact points at all engine speeds.

Another special object of the invention is to provide an efficient carburetor for internal combustion engines which is characterized by simplicity and by adjustability to accurately regulate the mixture of air with fuel.

Another special object of the invention is to provide a simple means whereby an engine may be mounted quickly, easily and securely upon a support and may be equally as quickly and easily demounted therefrom, such means being particularly designed for use in connection with miniature engines for miniature aircraft to enable a single engine readily to be transferred from one miniature aircraft to another.

Another special object of the invention is to provide a simple means of quickly and easily mounting a fuel tank upon an engine or other support in a manner such that, under normal conditions, it is held securely assembled with the engine or other support, but becomes detached therefrom by a force applied laterally thereagainst without harm to the tank, the engine or other support or to the mounting means. This is of particular advantage in connection with miniature aircraft and miniature aircraft engines to avoid tank, engine and aircraft damages as a result of crashes which frequently occur.

Another special object of the invention is to provide a fuel tank, particularly for miniature aircraft engines, embodying a construction whereby the amount of fuel that is available for operation of the engine may readily be predetermined, thereby to predetermine the period of time of operation of the engine and the time of flight of the aircraft under engine power.

With the foregoing and various other objects in view, which will become more fully apparent as the nature of the invention is better understood, the same consists in the various novel features of construction, combination and arrangement of parts as will be hereinafter more fully described, illustrated in the accompanying drawings and defined in the appended claims.

In the accompanying drawings, wherein like characters of reference denote corresponding parts in related views.

The engines and adjuncts illustrated in the drawings are specially designed for use in connection with miniature aircraft. It is to be understood, however, that said engines and some or all of said adjuncts are, or may be, equally as well adapted to various other uses.

Referring to the drawings in detail, first with particular reference to the engine proper illustrated in Figures 1 to 4 of the drawings, it will be observed that the same includes, as usual, a crank-case 10 and a cylinder 11.

The cylinder 11 may be cast integrally with the crank-case 10 or may be separate therefrom and joined thereto in any suitable manner. In the present instance there is a screw-threaded connection between the cylinder 11 and the crank-case 10 as indicated at 12.

The crank case 10 is formed with an opening in its rear wall to permit insertion and removal of a piston 13 into and from the cylinder 11 and insertion and removal of a crank shaft 14 into and from a bearing in the crank case front wall, but normally said opening is closed by a plug 15 removably engaged with the crank-case in any suitable manner, as, for example, by being threaded therein as illustrated in the present instance.

The front wall of the crank-case 10 is formed with a forward extension 16 bored to accommodate the crank-shaft 14, there being preferably, but not necessarily, a bearing sleeve 17 interposed between said crank-shaft and the wall defining the bore in said extension 16.

The crank-shaft 14 extends beyond the forward end of the extension 16 and has its forward end portion reduced in diameter or otherwise shouldered and suitably formed to have non-rotatably engaged thereon a timer actuating cam 18 and an abutment 19 for an element to be driven, such as a propeller designated as 20. Preferably the cam 18 and the abutment 19 are of one-piece construction. In any event, inward movement of the cam and abutment along the shaft is limited by the shoulder on the shaft. The propeller 20 is clamped against the abutment 19 by a bolt 21 the shank of which is passed through an opening in the hub of the propeller and threaded into a bore in the outer end portion of the crank-shaft, said bolt having, of course, a suitable head for engagement with the outer face of the propeller hub.

When the cam 18, the abutment 19 and the propeller 20 are assembled with the crank-shaft 14, the cam 18 serves as a shaft-carried abutment cooperating with the outer end of the crank-case extension 16 to limit inward movement of the crank-shaft relative to the crankcase. On the other hand, outward movement of the crank-shaft relative to the crank-case is limited by a crank 22 on the inner end of the crank-shaft cooperating either with the inner face of the front wall of the crank-case or with a flanged inner end portion of the bearing sleeve 17, as the case may be. Thus, the crank-shaft is free-running and is held against longitudinal movement relative to the crank-case.

The piston 13 is not directly connected with the crank 22 but is floating. In other words, there is an indirect connection between the piston 13 and the crank 22 through a sleeve or carrier cage 23 which is disposed within said piston and with respect to which said piston is freely rotatable and freely slidable longitudinally within predetermined limits.

A rod 24 connects a crank pin 25 on the crank 22 with the sleeve or carrier cage 23, the said rod having, as shown, a pivotal or wrist pin connection with the latter. Therefore, the sleeve 23 is positively reciprocated when the crank-shaft 14 is rotated.

In the head of the piston 13 is a central port 26 which is of outwardly tapering or outwardly converging form, while on the head of the sleeve 23 is a central valve formation 27 for opening and closing said port responsive to longitudinal movement of the piston 13 and the sleeve 23 relative to each other. Inward movement of the piston 13 and the sleeve 23 relative to each other results in closing of the port 26, while outward movement of said piston and sleeve relative to each other results in opening of said port. Outward movement of the piston and sleeve relative to each other is limited by a suitable piston-carried abutment 28 with which the sleeve 23 cooperates and which may conveniently be in the form of an expansible split ring seated in a groove in the inner side of the skirt of the piston 13 for cooperation with the inner end of the sleeve 23. In any event, the permissible relative outward movement of the piston and sleeve preferably is not greater than is required to amply open the port 26.

Inward movement of the piston 13 in the cylinder 11 is limited by any suitable means, such, for example, as a shoulder 29 at or near the inner end of the cylinder to be engaged by the inner end of the piston skirt, the arrangement in this respect being such that inward movement of the piston 13 is stopped prior to the sleeve reaching its limit of inward movement.

The piston 13 and sleeve 23 are open at their inner ends and ports 30 are provided in the outer end of the sleeve 23 around the valve formation 27 thereof. Consequently, when the port 26 is open, gaseous fuel is free to flow from the crankcase of the engine through the sleeve 23 and the ports 30 thereof and through the piston port 26 into the cylinder 11 between the outer end thereof and the piston 13.

In the side wall of the cylinder 11 are exhaust ports 31 disposed to be completely uncovered by the piston 13 when the latter reaches its innermost position. These ports are spaced preferably entirely around the cylinder and have a combined area to permit free and rapid exhaust of products of combustion from the cylinder.

The engine proper described is of the two-stroke-cycle type in which gaseous fuel is drawn into the crank-case 10 by outward movement of the piston 13, is compressed in said crank case by inward movement of said piston and is by-passed from said crank-case through the ports 30 and 26 when the sleeve 23 is moved inwardly relative to the piston 13. Assuming the provision of suitable means for controlling supply of gaseous fuel to the crank-case 10 and sparking of a spark plug 32 located in the outer end of the cylinder, preferably centrally thereof, the operation of the engine, beginning with a power stroke of the piston, is as follows:

The piston is driven inwardly, carrying with it the sleeve 23, the latter remaining in its outer position relative to the piston due to its inertia and to its exposed outer end portion being of lesser area than the outer end portion of the piston. Prior to the crank 22 reaching bottom dead-center position the inner end of the piston skirt contacts the shoulder 29 and inward movement of the piston ceases. By this time the exhaust ports 31 have been uncovered and exhaust takes place. Since inward movement of the sleeve 23 is unrestrained, said sleeve continues to move inwardly until the crank 22 reaches bottom, dead-center position. This results in opening of the port 26 and a rush of gaseous fuel, compressed in the crank-case by inward movement of the piston, through the ports 30 and 26 into the cylinder space outwardly of the piston 13. Due to the outwardly converging form of the port 26 the inrushing gaseous fuel is directed through the center of the cylinder to the outer end thereof. It then is deflected laterally outward by the outer end wall of the cylinder and flows inwardly along the cylinder walls, thereby materially assisting in assuring a thorough scavenging of gases of combustion from the cylinder. With continued rotation of the crank-shaft 14 the sleeve 23 is moved outwardly, which results in closing of the port 26 and picking up of the piston 13 by said sleeve. The sleeve and piston then move outward as a unit and the fresh charge is compressed. At the same time, a new charge is drawn into the crank-case 10. As the piston approaches its limit of outward movement the compressed, fresh charge of gaseous fuel is ignited by the spark-plug 32 and the recounted operations are repeated.

The form and arrangement of the port 26 and its control valve 27 and the disposition of the exhaust ports 31 as shown and described insures a thorough scavenging of the engine and a full, fresh charge of gaseous fuel thereto during each cycle thereof at all speeds. The engine therefore is exceptionally efficient and, consequently, may be constructed to have an exceptionally high horse power to weight ratio.

While any suitable means may be employed to control the admission of gaseous fuel to the crank-case 10 and to regulate the mixing of air with raw fuel to provide the gaseous fuel for admission to said crank case, the present invention includes novel means for these purposes. In the crank-shaft 14 is a longitudinal bore 33 which opens through the inner end of said crank-shaft into the crank-case 10. Also, in said crank-shaft is a lateral port 34 which provides, at a predetermined time during rotation of said shaft, communication between the bore 33 and a gaseous fuel supply duct 35, provided, for example, in a suitable portion of the crank-case 10. If a bearing sleeve 17 is used, same is provided with a port in alinement with the duct 35 to permit the communication stated. The port 34 and the duct 35 are disposed to become alined to admit a charge of gaseous fuel to the crank-case 10 responsive to outward movement of the piston 13 and to be disalined during inward movement of the piston 13 so that a charge contained in the crank-case may be compressed therein for subsequent admission to the cylinder as heretofore described.

Formed in a suitable portion of the crank-case 10 is an elongated, cylindrical valve chamber 36 in which is rotatably mounted a hollow, cylindrical valve 37. This valve is open at its inner end and its interior is in communication through its open, inner end with the duct 35. At its outer end, said valve is closed and provided with a suitable handle 38 for use in manually, rotatably adjusting the same. In said valve, medially thereof, is a circumferentially extending slot 39 in which is disposed the inner end of a fuel nozzle 40 which is threaded into an opening in the wall defining the chamber 36 and which may be connected with any suitable source of fuel supply. The valve thus is held in said chamber by said nozzle 40, the latter serving at the same time, as an abutment engageable by the walls defining the ends of the slot 39 to limit rotative adjustments of the valve.

In the wall defining the chamber 36 are two air inlet ports 41 and 42, while in the side wall of the valve 37 are two air inlet ports 43 and 44 for cooperation, respectively, with the ports 41 and 42. The ports 41, 43 are disposed inwardly with respect to the nozzle 40; that is to say, between said nozzle and the duct 35. On the other hand, the ports 42, 44 are disposed outwardly with respect to the nozzle 40; that is to say, to the side of said nozzle remote from the duct 35.

In the present instance the valve 37 is rotatable through an angle of approximately 180° and the ports 41, 43 and 42, 44 are of such circumferential lengths that when said valve is at its limit of rotation in one direction both ports 41 and 42 are closed, while when said valve is at its limit of rotation in the other direction both ports 43 and 44 are alined with the ports 41 and 42, respectively, and air is free to enter the valve through both pairs of ports. The port 44 is longer than the port 43 and is disposed so that it begins to uncover the port 42 immediately upon rotation of the valve from its first mentioned position toward its second mentioned position and thereafter maintains said port 42 open during such rotation of the valve. On the other hand, the shorter-length port 43 is disposed relative to the port 43 to begin to open the port 41 only after the port 42 has been fully opened by rotation of the valve 37 from its first mentioned position toward its second mentioned position. Because of this arrangement, initial rotation of the valve from its first mentioned position toward its second mentioned position results in opening of the port 42 and maintenance of the port 41 closed. Air then is drawn only through the ports 42, 44, and since air drawn through these ports is required to flow over the fuel nozzle 40 in order to reach the duct 35, an effective mixing of fuel and air results. If a rich mixture is desired the valve 37 is rotated to aline greater or lesser areas of the ports 42, 44, depending upon the mixture richness desired. In any event, the valve is not rotated so far as to aline, or partly aline, the ports 41, 43. On the other hand, if a lean mixture is desired the valve is further rotated to aline the ports 41, 43 to a greater or lesser extent, depending upon the mixture leanness desired. Air entering the valve through the ports 41, 43 does not flow over the nozzle 40 and, therefore, as lean a mixture as desired may be obtained.

Preferably the valve chamber 36 is disposed at the bottom of the crank-case 10 as shown, although it may be disposed elsewhere if desired. In any event, the described arrangement affords a simple, practical means especially suited for miniature engine use to enable a wide range of fuel and air mixing regulation.

While any suitable timer may be used in association with the present engine, there is provided according to the invention, a timer which is characterized on the one hand by exceptionally quick breaking of its contact points and, on the other hand, requiring very little power for its operation. Quick breaking of the contact points has the special advantage of permitting high engine speeds to be obtained and assuring a uniform spark at all engine speeds. It has the further advantage of reducing arcing and thereby promoting longevity of the contact points and of conserving current. On the other hand, in connection with miniature engines which have a small power output, it is especially desirable and advantageous to provide a timer which requires little power for its operation.

The present timer comprises a lever arm 45 rotatably mounted on the crank-case extension 16. A split-band portion 46 at the inner end of said lever arm embraces the extension 16 and is constricted friction-tightly into engagement therewith by a screw 47, whereby the lever remains in any rotated position to which it may be adjusted.

The lever arm 45 and the split band portion 46 are joined together by a pair of spaced side walls 48 between which extends a pivot pin 49 which is disposed transversely with respect to the said split-band portion 46. On said pivot pin 49 are rockably mounted a substantially L-shaped hammer member 50 and an arm 51 carrying a contact 52. The hammer member 50 is disposed in front of the lever arm 45 and includes two arms 53 and 54, the former of which is disposed adjacent to the split-band portion 46 and extends substantially parallel thereto, and the latter of which extends outwardly from the inner end of said arm 53 substantially parallel to the lever arm 45. The contact arm 51 also extends outwardly and is disposed directly in front of the hammer arm 54. Moreover, said contact arm 51 includes a forwardly extending arm 55 spaced outwardly from and overlying the hammer arm 53.

Between the lever arm 45 and the hammer arm 54 is a coil spring 56 which tends constantly to rock the hammer member 50 forwardly and inwardly about the pivot pin 49, while between the hammer arm 53 and the arm 55 of the contact arm 51 is a coil spring 57 which tends constantly to swing said contact arm 51 rearwardly against the hammer arm 54.

At the front end of the hammer arm 53 is an outwardly extending arm 58 carrying at its outer end a forwardly extending pin 59 on which is mounted, for swinging movement transversely with respect to the split-band 46, a cam-follower finger 60 the inner end portion of which is disposed for cooperation with the cam 18.

Projecting forwardly from the arm 58 is a lug 61 which constitutes a stop, engageable by one side edge of the finger 60, to limit swinging movement of said finger in the direction in which the cam 18 tends to swing same during normal operation of the engine. Said arm 60 is free to swing in the opposite direction, but constantly is urged toward the stop lug 61 and normally is held thereagainst by a suitable spring 62. In the present instance this spring 62 is of the hair pin type and is supported by the pin 59 and includes a pair of arms one of which is disposed against the outer side of the lug 61 and the other of which is disposed against the outer side of a lug 63 which extends forwardly from the finger 60.

The cam 18 is of the peripheral type and gradually rises to a peak where it abruptly ends, the face defining its abrupt trailing end being disposed either radially or being undercut as desired. Likewise, the side edge of the finger 60 which the cam last passes during normal operation of the engine is disposed either radially with respect to the axis of rotation of the cam, or, if desired, is undercut in the same manner as the face defining the abrupt, trailing end of said cam. In either case the arrangement is such that as the cam rotates it wipes the free or inner end of the finger 60 and gradually moves said finger outwardly, thereby rocking the hammer member 50 outwardly and rearwardly until the abrupt, trailing end of the cam alines with the edge of the finger 60 which the cam last passes. The finger then is released and under the influence of the spring 56 the hammer member 50 is rocked forwardly and inwardly quite suddenly due to the radial or undercut disposition of the face defining the trailing end of the cam and to the similar disposition of the edge of the finger 60 which the cam last passes during normal operation of the engine. If the engine should backfire, the finger 60 simply is swung on its pivot pin 59 by the cam and no harm results. On the other hand, since the lug 61 prevents rotation of the finger 60 on its pivot pin 59 in the direction in which the cam, during its proper direction of rotation, tends to rotate said finger, normal rotation of the cam results in periodically lifting said finger and in periodically rocking the hammer member 50 outwardly and rearwardly.

Figures 1, 10, 11, 12, 13, 14:
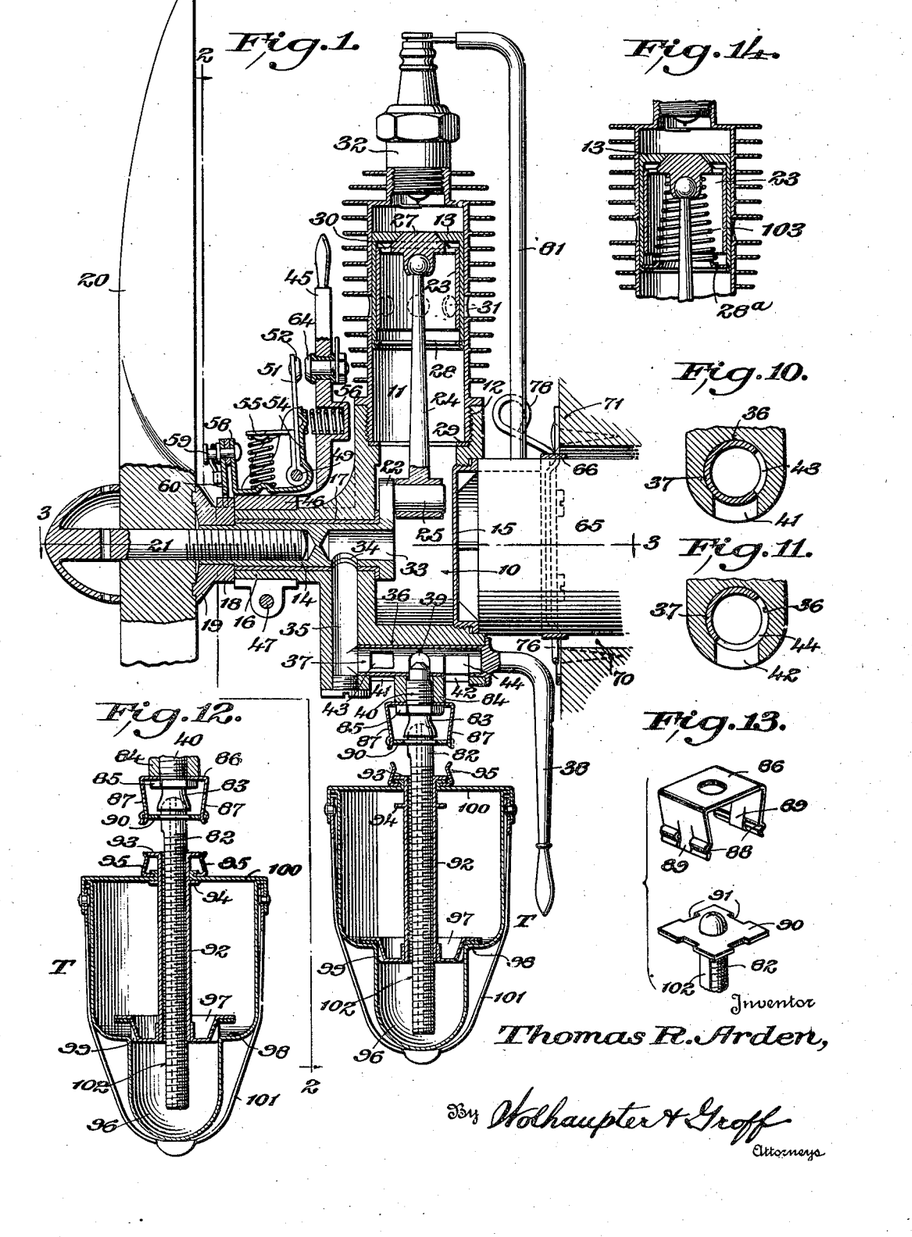
Figure 1 is a central, longitudinal section through an internal combustion engine and certain adjuncts therefor constructed in accordance with the invention.
Figures 10 and 11 are transverse sections through the respective air inlet ports of the carburetor.
Figure 12 is a vertical section through the fuel tank showing a status of the parts thereof to admit fuel from the tank proper to the auxiliary fuel chamber thereof.
Figure 13 is a perspective view, in separated relationship, of the parts for detachably mounting the fuel tank upon the engine.
Figure 14 is a detail sectional view illustrating a spring for closing the piston-carried inlet valve of the engine.
Figures 2, 8, 9:
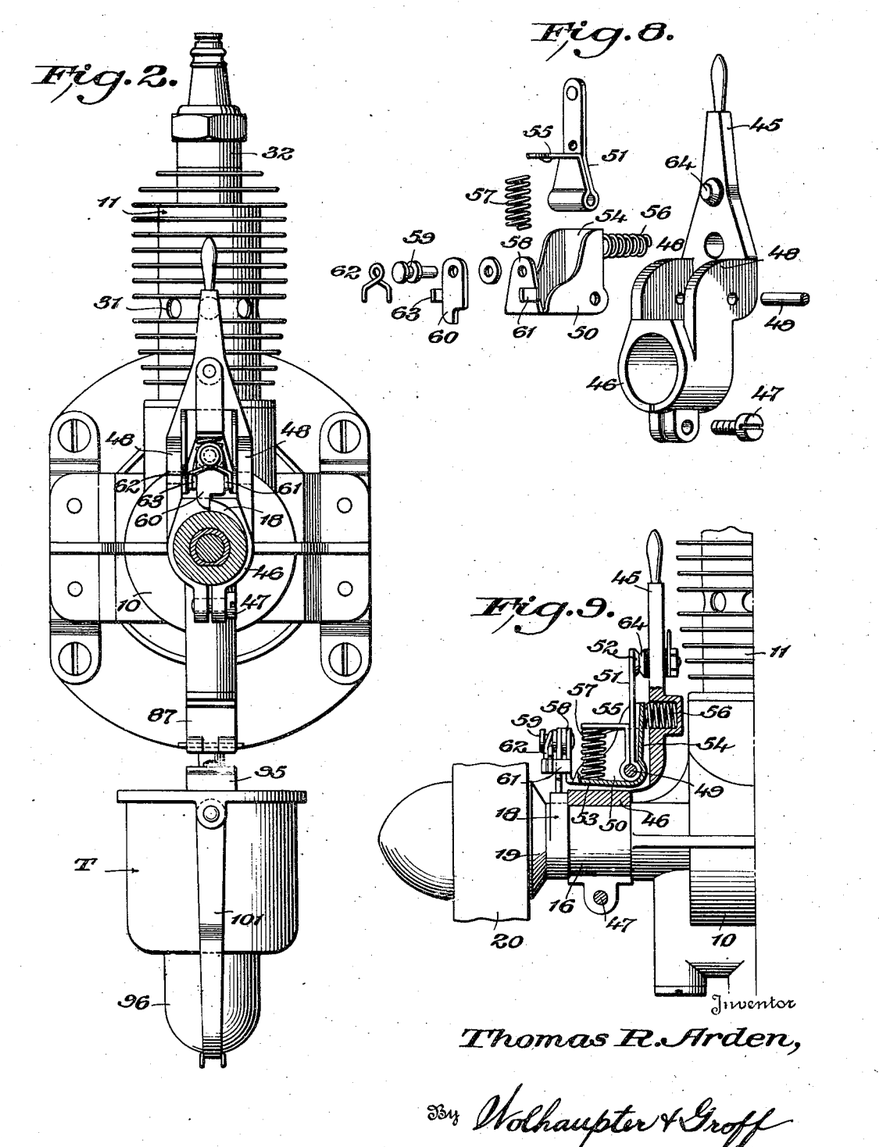
Figure 2 is a vertical section on the line 2—2 of Figure 1.
Figure 8 is a perspective view of the parts of the engine timer in separated relationship.
Figure 9 is a vertical section through the engine timer showing the status of the parts thereof when the contact points are closed.
Figures 3, 4, 5, 6, 7:
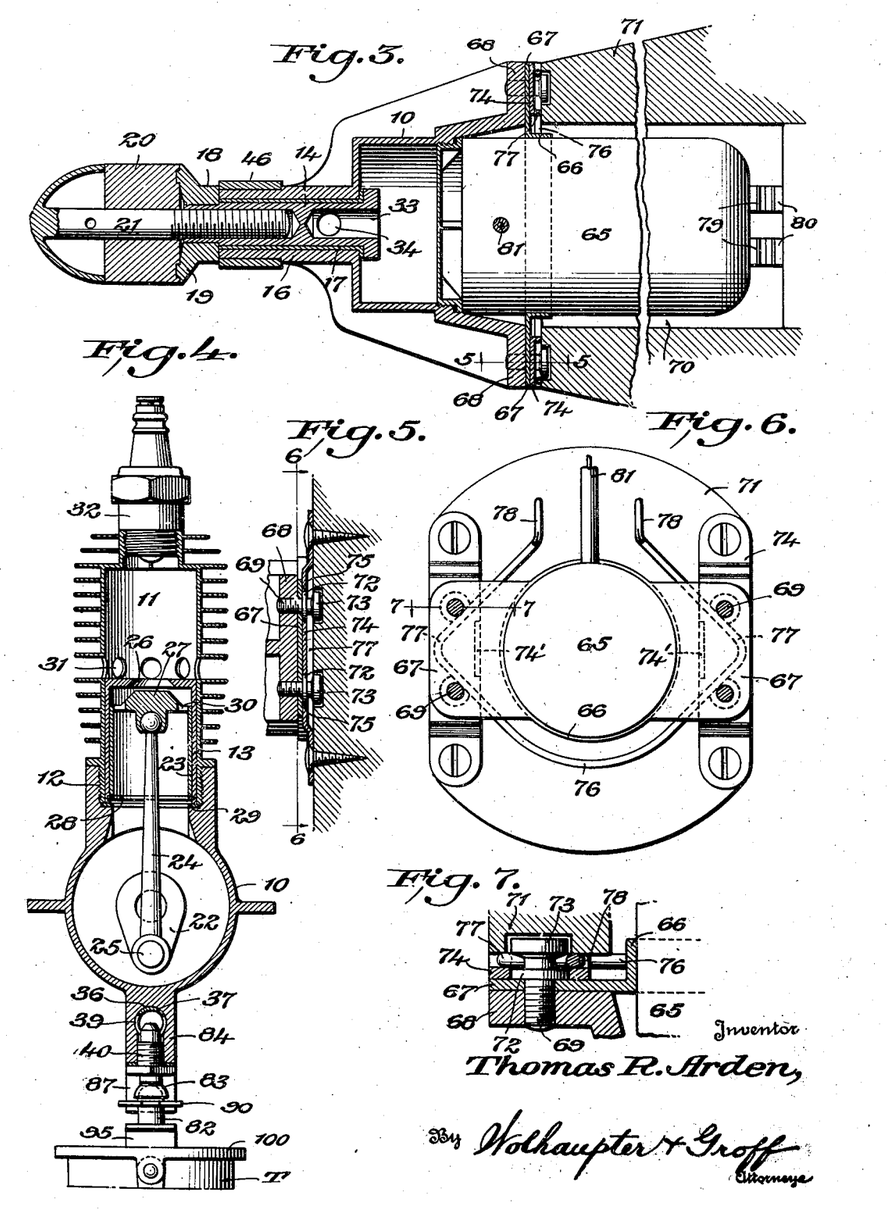
Figure 3 is a horizontal section on the line 3—3 of Figure 1.
Figure 4 is a central, vertical transverse section through the engine shown in Figure 1.
Figure 5 is a detail section on the line 5—5 of Figure 3.
Figure 6 is a section on the line 6—6 of Figure 5.
Figure 7 is a detail section on the line 7—7 of Figure 6.

The hammer member 50 and the contact arm 51 are rockable relative to each other. When the finger 60 is not engaged by the cam, or is engaged by the low forwardly and inwardly rocked position by the spring 56. In this position of said hammer member the arm 54 lies against the rear face of the contact arm 51 and holds said contact arm in a forwardly swung position with its contact 52 spaced from a companion contact 64 carried by the lever arm 45 (Fig. 1). As the cam 18 lifts the finger 60 the hammer member 50 is rocked outwardly and rearwardly and, acting through the spring 57, rocks the contact arm 51 rearwardly until its contact 52 engages the contact 64. Rearward rocking movement of the contact finger 51 thereby is arrested. This occurs prior to complete lifting of the finger 60 and, consequently, prior to complete outward and rearward rocking of the hammer member 50 by the cam 18. Accordingly, following engagement of the contact 52 with the contact 64, the arm 54 of the hammer member 50 moves rearwardly away from the contact arm 51, (Fig. 9). The result is that when, finally, the cam passes the finger 60 and suddenly releases same, the spring 56 acts suddenly to rock the hammer member 50 forwardly and inwardly, thereby causing the arm 54 of said hammer member to strike the contact arm 51 a hammer blow in a forward direction. As a consequence, an exceedingly quick separation of the contact 52 from the contact 64 results.

The spring 57 may be relatively weak since its function is merely to hold the contact 52 engaged with the contact 64 when the hammer member 50 is in its position shown in Figure 9. Likewise, the spring 56 may be relatively weak because it acts through a hammer element to effect separation of the contact 52 from the contact 64. Consequently, the present timer requires very little power for its operation.

As will be understood, the contact 64 may be connected with the spark plug 32 through a spark coil of any suitable type to effect sparking of said spark-plug at proper times responsive to "breaking" or separation of the contacts 52, 64.

A feature of the present invention resides in combining a spark-coil 65 in a rigid, compact manner with the present engine. The spark-coil is disposed horizontally at the rear of the engine and has its front end fitted neatly in the rear portion of the crank-case opening in which the plug 15 is disposed. Rearwardly of its front end said spark-coil is tightly embraced by a band 66 which has wings 67 extending from opposite sides thereof. These wings lie against the rear faces of engine mounting bracket arms 68 at either side of and integral with the engine crank-case and are fastened to said bracket arms by screws 69. The spark-coil thus is secured in firm assembly with the engine in a position to be advantageously inserted into a cavity 70 in the nose-block 71 of a miniature aircraft when mounting the engine upon the front end of said nose-block, as is contemplated by the invention.

Simple means is provided whereby the engine may be quickly, easily and securely mounted on the nose-block 71 and equally as quickly and easily removed therefrom. Two vertically spaced and preferably vertically alined screws 69 are employed to fasten each wing 67 to its related bracket arm 68. These screws are provided with flanges 72 engaging the rear faces of the wings 67 whereby said wings are secured against the rear faces of the bracket arms 68. In addition, said screws are provided with heads 73 which are spaced rearwardly from the flanges 72 and which preferably have forwardly tapered, forward or under faces. Fastened to the front end of the nose-block 71 are two plates 74, 74 having medial portions that are forwardly offset with respect to the front face of said nose-block. In the forwardly offset, medial portion of each plate 74 are two holes 75, 75 of sufficient diameters to permit the screw heads 73 to pass therethrough. The holes of each plate 74 have the same vertical spacing as the screws 69 of the respective pairs and said plates are mounted on the nose-block 71 so that the lateral spaced apart relationship of the holes of the respective plates is the same as the lateral spaced apart relationship of the respective pairs of screws 69. In other words, the vertical and lateral spacing of the four holes in the two plates 74 is the same as the vertical and lateral spacing of the four screws 69. Accordingly, by holding the engine in an upright position in front of the nose-block 71, the screws 69 may be alined with the holes 75. By then moving the engine rearwardly the heads 73 of the screws 69 may be passed through the holes 75 to positions rearwardly of the plates 74. The engine may be moved rearwardly until the wings 67 contact the plates 74. Thereby, the flanges 72, which are of the same diameter as the holes 75, may be engaged in said holes 75. The engine thus will be held against any vertical, lateral or rearward movement relative to the nose-block 71.

To hold the engine against forward movement relative to the nose-block 71 a substantially U-shaped, wire spring 76 is employed. The respective side portions or arms 77 of this spring are of substantially V-shape and are proportioned to engage between the screws 69 of the respective pairs. Said spring has its V-shaped side portions or arms 77 disposed rearwardly of and against the medial portions of the plates 74 and is provided at the upper or free ends of its arms with suitable handle formations 78 to be grasped and pressed together to move the V-shaped arms 77 toward each other. Due to the inherent resiliency of the bottom portion of the spring which connects the V-shaped arms 77 thereof, said arms have a constant tendency to spring apart beyond the holes 75 in the plates 74. Prior to passing the heads 73 of the screws 69 rearwardly through the holes 75 the handle formations 78 of the spring 76 are grasped and pressed together to move the V-shaped side portions 77 of said spring inwardly of said holes 75. The heads of the screws 69 then are passed rearwardly through the holes 75 and thereupon the spring 76 is released to permit its V-shaped side portions 77 to spring apart. As said V-shaped side portions spring apart they engage the front or under, forwardly tapered faces of the heads 73 of the screws 69 and tend to wedge said screws rearwardly, thereby maintaining the wings 67 seated against the plates 74. At the same time, because of being interposed between the plates 74 and the heads 73 of the screws 69, the said side portions 77 of the spring 76 serve as locks holding the engine against forward movement relative to the nose-block 71.

To release the engine for removal from the nose-block 71 it simply is necessary to grasp the handle formations 78 and press them together until the V-shaped side portions 77 of the spring 76 are disposed inwardly of the heads 73 of the screws 69. The heads 73 then are free to pass forwardly through the holes 75 upon forward movement of the engine relative to the nose-block 71.

Flanges 78 bent rearwardly from the inner edges of the plates 74 lie inwardly of the V-shaped side portions 77 of the spring 76 and serve to prevent loss of said spring from behind the plates 74 when an engine is not mounted on the nose-block 71.

The spark-coil 65 is provided at its rear end with a pair of contacts 79 to engage a companion pair of contacts 80 at the inner end of the cavity 70 when the engine is operatively mounted on the nose-block 71. The contacts 80 may be mounted upon any suitable support and may be connected with any suitable source of current.

Accordingly, mounting of the engine on the nose-block 71 establishes connection of the ignition system of the engine with a source of current. There is a connection 81 between the spark-coil 65 and the spark-plug 32 and, of course, a connection (not shown) between the contact 64 and the spark-coil 65 whereby engagement and separation of the contacts 52, 64 causes sparking of the spark-plug 32.

While a fuel tank of any suitable type may be connected in any suitable manner with the nozzle 40, a special feature of the present invention resides in the provision of a fuel tank embodying means to regulate the amount of fuel that may be supplied therefrom to the engine, thereby to predetermine the duration of operation of the engine. Another special feature of the present invention resides in mounting the fuel tank so that a force exerted laterally thereagainst will detach the same from its support without harm to the tank or its support. This is of particular advantage in connection with fuel tanks for miniature aircraft because, usually, said tanks are mounted in such exposed positions that they strike the ground or other obstructions when the aircraft crashes.

The present fuel tank is designated generally as T and is provided with a fuel delivery tube 82 which extends through the top of said tank and which, at its upper end, preferably is rounded to be readily engaged in a flexible cup-piece 83 carried by and depending from the nozzle 40, thereby to establish communication between the tank and said nozzle. The nozzle 40 is threaded into a base 84 depending from the casing of the valve 37 and is provided with a head 85. Between the head 85 and the bottom face of the boss 84 is clamped the medial portion of a spring clip 86 which is of inverted U-shape and which includes a pair of depending spring arms 87. Near their lower ends the side portions of these arms are provided with inwardly opening grooves 88 (Fig. 13), while between their grooved side portions said arms are provided with tongues 89.

Fixed to the tube 82 is a horizontally disposed, rectangular plate 90 which is of a length and width equal to or slightly greater than the normal distance between the bottoms of the grooves 88 in the respective arms 87 and which has each edge thereof medially recessed as indicated at 91.

Below the grooves 88 the side portions of the arms 87 are inclined downwardly and outwardly. Accordingly, by engaging opposite side edges of the plate 90 with the inclined bottom portions of the arms 87 and by pressing said plate upwardly said arms will be sprung apart to permit said plate to be entered between them. When, however, the edges of the plate become alined with the grooves 88 the arms 87 will spring inwardly and the said opposite side edges of the plate will be seated in said grooves. Alternatively, one edge of the plate 90 may initially be seated in the grooves 88 of one of the clip arms 87 and said plate may then be rocked to engage its opposite edge in the grooves of the other clip arm. In any event, when opposite side edges of the plate 90 are seated in the grooves 88 the fuel tank is sufficiently securely suspended to remain in operative assembly with the engine under all ordinary conditions. At the same time, said tank obviously is readily separable from the clip 86 by a force exerted in any direction laterally against the tank. Consequently, landings or crashes of aircraft having fuel tanks detachably mounted thereon as described seldom result in injury to the tank or its mounting means.

The plate 90 is spaced from the upper rounded end of the tube 82 by an amount such that, when the plate is operatively engaged with the grooves 88 in the arms 87, the said upper end of the tube is operatively disposed in the flexible cup-piece 83. Thus, in mounting the fuel tank by means of the arms 88 an operative connection is effected between the tube 82 and the nozzle 40.

The tube 82 extends through and is threaded in a sleeve 92 which is disposed vertically in the tank T, preferably centrally thereof, and which has its upper end portion extending through a central opening in the tank top. At its upper end the sleeve 92 is provided with an outwardly extending flange 93, while at a point within the tank T and suitably spaced below the flange 93 said sleeve is provided with a suitable stop 94. The tank T is vertically slidable relative to the sleeve 92, upward movement thereof being limited by the flange 93 and downward movement thereof being limited by the stop 94.

Suitably secured to the top of the tank T is a U-shaped spring clip having a pair of spring arms 95 disposed at opposite sides of the sleeve 92. These spring arms are inclined upwardly and inwardly and are designed to cooperate with the flange 93 to hold the tank T either in a raised position relative to the sleeve 92, as illustrated in Figure 1, of the drawings, or in a lowered position relative to said sleeve as illustrated in Figure 12 of the drawings.

The bottom of the tank T is in the form of a well 96 of smaller diameter than the tank proper. Communication between this well and the tank proper is controlled by a valve 97 cooperating with a seat 98 constituted by an outwardly directed portion of the wall of the tank T at the top of the well 96. The valve 97 is carried by the lower end of the sleeve 92 and is designed to engage the seat 98 and to deny communication between the tank proper and the well 96 when the tank is at its upper limit of movement relative to the sleeve 92. On the other hand, when the tank is at its lower limit of movement relative to the sleeve 92, the seat 98 is spaced below the valve 97 and communication is established between the tank proper and the well 96. The valve 97 preferably is of cup-shape and has a portion thereof disposed constantly in the upper end portion of the well 96, thereby to support the bottom portion of the tank T against lateral movement relative to the sleeve 92. If the valve is of cup-shape, its cup portion may have peripheral indentations 99 to afford communication between the well and the tank proper when the tank is in its lower position and the valve is open.

By threaded adjustment of the tube 82 relative to the sleeve 92 the lower end of said tube 82 may be caused to be spaced various different distances from the bottom of the well 96 when the tank T is in either its upper or lower position and the valve 97 is closed. If the adjustment in this respect is such that the lower end of the tube 82 is disposed near the bottom of the well 96 when the tank T is in its lower position and the valve 97 is open, practically all fuel may be contained in said tank is available for operation of the engine, since the fuel is free to flow from the tank proper into the well 96 and the supply to the engine ceases only when the fuel level drops to the bottom of the tube 82. On the other hand, when the tank T is in its upper position and the valve 97 is closed, only fuel that is contained in the well 96 is available for operation of the engine. Moreover, the amount of fuel contained in the well 96 that is available for operation of the engine depends upon the spacing of the lower end of the tube 82 from the bottom of said well when the tank T is in its upper position, since the engine fuel supply will cease as soon as the level of the fuel in the well drops to the bottom of the tube 82. Any suitable scale means may be provided to indicate different spacings of the lower end of the tube 82 above the bottom of the well 96 when the tank T is in its upper position. Each such different spacing corresponds to a certain amount of fuel that is available for operation of the engine. A given amount of fuel will suffice for operation of the engine over a given period of time. Accordingly, the duration of any given period of operation of the engine may be predetermined by relative longitudinal adjustment of the tube 82 and the sleeve 92 to cause the lower end of the tube to be disposed a certain distance above the bottom of the well 96 when the tank T is in its raised position and the valve 97 is closed. In this connection it is understood, of course, that prior to any given limited period of operation of the engine the tank T first is lowered to permit the well 96 to be filled from the tank proper and then is raised to deny any further flow of fuel from the tank proper into said well.

The tank T may be permanently closed at its top and may be provided in its top with a filling opening. Preferably, however, said tank is provided with a cap or cover 100 that is removable to afford access to the tank for cleaning or other purposes. If a removable cap or cover is provided it may be secured in closed relationship to the top of the tank in any suitable manner, as, for example, by means of a bail 101 swingable beneath the well 96.

To vent the well 96, the tube 82 may be exteriorly longitudinally grooved or cut-away at one side as indicated at 102.

Reverting to the present engine, it may be desirable in some instances to provide resilient means to tend constantly to urge the piston 13 inwardly relative to the sleeve 23, thereby particularly to insure against the piston being moved outwardly from its innermost position prior to closing of the part 26 by the valve 27. Figure 14 illustrates for this purpose resilient means in the form of a coil spring 103 disposed within the sleeve 23 and interposed between the outer end or head of said sleeve and a stop element 28a corresponding to the stop element 28 illustrated in Figures 1 and 4 of the drawings.

It is known that an internal combustion engine whose proportions are designed correctly, according to known standards, will function without spark ignition when the compression, speed, temperature and other factors involved are brought to a certain critical point; so critical in fact as to be only a laboratory experiment. However, an important feature of the present invention resides in so constructing an engine that the same may be started, and may be operated successfully, under self ignition, and which, in operation is quite flexible in that its speed may be varied over a wide, useful range.

Figure 15:
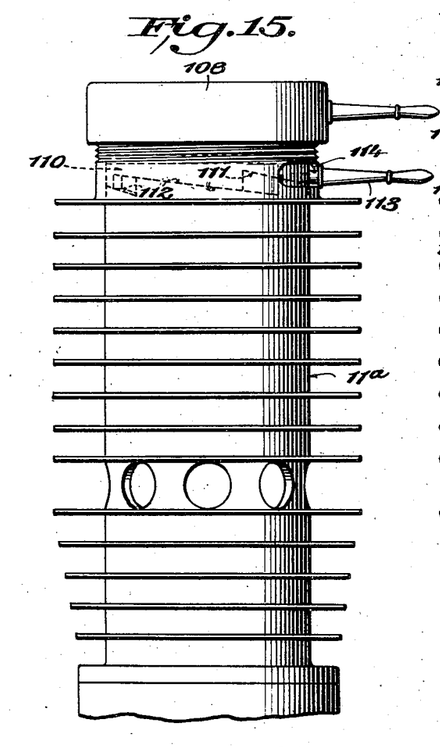
Figure 15 is a side elevation of a form of the engine designed to operate without spark ignition.
Figure 16:
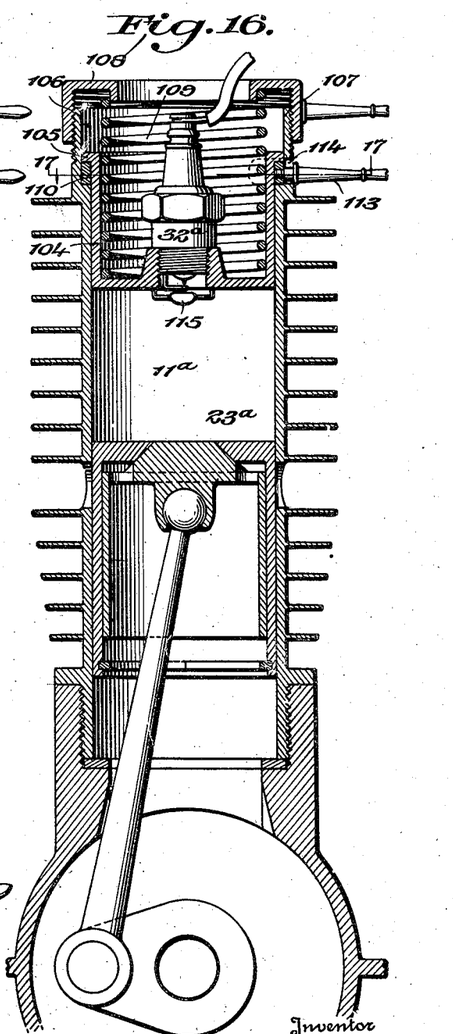
Figure 16 is a central vertical section through the engine illustrated in Figure 15.
Figure 17:
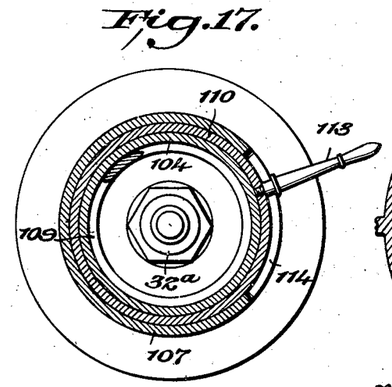
Figure 17 is a horizontal section on the line 17—17 of Figure 16.

Figures 15 to 17 of the drawings illustrate an engine constructed in accordance with one practical embodiment of the invention to operate successfully at various different speeds under self-ignition and without fuel injection such as is characteristic of engines of the Diesel type. For convenience, this engine has been illustrated as having the same general construction and mode of operation as the engine illustrated in Figures 1 to 4 of the drawings. An engine embodying such a construction is particularly well suited for operation under self-ignition because of its thorough scavenging and because it readily permits use of a cylinder head which, in accordance with the present invention, is movable to vary the area of the combustion chamber of the engine. However, as will later become apparent, the present self-ignition engine is not necessarily of the design illustrated in Figures 1 to 4, but may have various other designs so long as certain essentials are preserved. These essentials consist, primarily in the provision of a cylinder head which is movable longitudinally of the cylinder to vary the area of the combustion chamber of the engine; which is spring urged inwardly so as to be capable of moving outwardly under the force of a charge exploding in the combustion chamber, and which has associated therewith adjustable means for variably predetermining its innermost position.

In accordance with the present specific embodiment of the invention the engine cylinder designated as 11a has mounted in its outer end, for longitudinal sliding movement relative thereto, a cylinder head designated as 104. This head is of cup-like form, closed at its inner end and open at its outer end and, at its outer end is provided with an annular, outwardly extending flange 105 which is disposed within a counterbore 106 in an enlarged extreme outer end portion 107 of the cylinder 11a.

Threaded on the outer end portion 107 of the cylinder 11a is a cap member 108 and between this cap member and the cylinder head 104 is interposed a coil spring 109 which urges the cylinder head constantly inwardly.

Disposed in the counterbore 106 of the cylinder 11a in surrounding relationship to the cylinder head 104 and interposed between the flange 105 and the wall defining the bottom of said counterbore, is a ring 110 which is rotatably adjustable and which has its inner edge formed with a series of inclined cam faces 111 for cooperation with a companion series of cam faces 112 formed on the wall defining the inner end of the counterbore 106.

The ring 110 constitutes a stop engageable by the flange 105 of the cylinder head 104 to limit inward movement of the cylinder head. By rotating the ring 110 in one direction it will be moved outwardly due to the cooperation of its cam faces 111 with the cam faces 112 and will move the cylinder head outwardly. On the other hand, by rotating said ring in the opposite direction, inward movement of the cylinder head by the spring 109 will be permitted. Rotation of the ring 110 may be effected in any suitable manner. In the present instance there is illustrated for this purpose a means in the form of a handle 113 projecting laterally from said ring through a slot 114 in the outer end portion 107 of the cylinder 11a. In any event, by rotatable adjustment of the ring 110 the inner limit of movement of the cylinder head 104 may variably be predetermined to variably predetermine the normal area of the combustion chamber of the engine.

The force exerted inwardly upon the cylinder head 104 by the spring 109 may be varied by rotating the cap member 108 to thread same inwardly or outwardly along the portion 107 of the cylinder. In any event, the strength of the spring 109 at all times is sufficient to prevent outward movement of the cylinder head under self-ignition pressure in the combustion chamber of the engine. The strength of said spring is not so great, however, as to prevent outward movement of the cylinder head under the force of an exploded charge in the cylinder.

Preferably the engine is provided with a spark-plug 32a whereby it may be started using spark ignition. Preferably, too, a heat retaining element 115 is provided in the combustion chamber of the engine to assist self-ignition. However, neither said spark-plug nor said element 115 is essential, as the engine may be started by self-ignition and will operate without the element 115.

Since varying the area of the combustion chamber of the engine determines that time at which, during outward movement of the engine piston 23a, self-ignition pressure will develop in the combustion chamber, and since the time at which ignition takes place in large measure determines the speed of the engine, it is apparent that, by rotating the ring 110 to vary the area of the combustion chamber of the engine, the speed of operation of the engine under self-ignition may be varied within a wide range. This would not be possible if the cylinder head were positively restrained against outward movement, for in that case, if ignition occurred prior to the piston 23a reaching a definite position short of its outermost position, explosion of a charge in the combustion chamber of the engine would prevent further outward movement of the piston. Due, however, to the cylinder head 104 being yieldably restrained against outward movement, it may yield outwardly under the force of an explosion in the combustion chamber to relieve the pressure therein and permit outward movement of the piston to continue even though ignition may occur at an early instant during outward movement of the piston. Outward movement of the cylinder head stores in the spring 109 energy which subsequently is expended in assisting to drive the piston inwardly. By the selection of a spring 109 of a certain inherent strength and by proper adjustment of the same by the cap piece 108 in relation to different adjustments of the innermost limit of movement of the cylinder head, the engine may be made to operate successfully within a wide speed range, and may even be started, employing self-ignition as distinguished from spark ignition. Such an engine is particularly advantageous in eliminating all spark ignition mechanism and as a power plant for miniature aircraft, is further particularly advantageous in that it eliminates the necessity of the aircraft carrying a weighty battery to furnish current for spark ignition.

Without further description it is thought that the features and advantages of the invention will be readily apparent to those skilled in the art, and it will, of course, be understood that changes in the form, proportion and minor details of construction may be resorted to, without departing from the spirit of the invention and scope of the appended claims.

I claim:

1. An internal combustion engine comprising a cylinder, a crank-shaft, a piston reciprocable within said cylinder, said piston being open at its inner end and including a skirt and a head, the head having a port therein, a sleeve reciprocable within said piston, said sleeve being open at its inner end and including a skirt and a head, a valve carried by the head of said sleeve for cooperation with said port, means limiting reciprocable movement of said sleeve relative to said piston to an amount necessary for opening and colsing of said port by said valve, the head of said sleeve having openings therein for flow of gases from the interior of said sleeve to said port, a rod connecting said sleeve with said crank shaft, and abutment means fixed with respect to said cylinder to stop inward movement of the piston prior to the sleeve reaching its limit of inward movement, thus to cause opening of the valve.

2. An internal combustion engine comprising a cylinder, a crank-shaft, a piston reciprocable within said cylinder, said piston being open at its inner end and including a skirt and a head, the head having an outwardly tapering port therein, a sleeve reciprocable within said piston, said sleeve being open at its inner end and including a skirt and a head, an outwardly tapering valve carried by the head of said sleeve for cooperation with said port, abutment means carried by said piston to limit inward movement of said sleeve relative to said piston, spring means interposed between said abutment means and said sleeve and tending constantly to move said piston inwardly relative to said sleeve to close said valve, the head of said sleeve having openings therein for flow of gas from the interior of said sleeve to said port, a rod connecting said sleeve with said crank shaft, and abutment means fixed with respect to said cylinder to stop inward movement of the piston prior to the sleeve reaching its limit of inward movement, thus to cause opening of the valve.

3. An internal combustion engine comprising a cylinder, a crank-shaft, a piston reciprocable within said cylinder, said piston being open at its inner end and including a skirt and a head, the head having an outwardly tapering port therein, a sleeve reciprocable within said piston, said sleeve being open at its inner end and including a skirt and a head, an outwardly tapering valve carried by the head of said sleeve for cooperation with said port, said piston having an internal groove in the skirt thereof near the inner end of said skirt, a ring seated in said groove and extending into the piston and constituting a stop engageable by the inner end of the skirt of said sleeve to limit inward movement of said sleeve relative to said piston, a spring interposed between said ring and the head of said sleeve and tending constantly to move said piston inwardly relative to said sleeve to close said valve, the head of said sleeve having openings therein for flow of gas from the interior of said sleeve to said port, a rod connecting said sleeve with said crank shaft, and means to stop inward movement of the piston prior to the sleeve reaching its limit of inward movement, thus to cause opening of the valve.

4. An internal combustion engine comprising a cylinder, a crank shaft, a piston element reciprocable in said cylinder, said piston element being open at its inner end and including a skirt and a head, a sleeve element closely fitting said piston element and reciprocable therein, said sleeve element being open at its inner end and including a skirt and a head, the heads of said elements having ports therein, valve means carried by the head of one of said elements for cooperation with the head of the other of said elements in response to reciprocation of said sleeve relative to said piston to control flow of fuel through said ports, means limiting inward movement of said sleeve relative to said piston, and abutment means fixed with respect to said cylinder to stop inward movement of said piston prior to said sleeve reaching its limit of inward movement, thus to cause opening of said valve means.

THOMAS R. ARDEN.